(12) United States Patent  
Blenkush et al.

(10) Patent No.: US 9,121,514 B2  
(45) Date of Patent: Sep. 1, 2015

(54) WEAR RING RETAINER FOR A GATE VALVE

(71) Applicant: DeZURIK, Inc., Sartell, MN (US)

(72) Inventors: Robert A. Blenkush, Sartell, MN (US); Sidney Watterodt, Cambridge (CA)

(73) Assignee: DeZURIK, Inc., Sartell, MN (US)

( * ) Notice: Subject to any disclaimer, the term of this patent is extended or adjusted under 35 U.S.C. 154(b) by 275 days.

(21) Appl. No.: 13/908,662

(22) Filed: Jun. 3, 2013

(65) Prior Publication Data

US 2013/0334451 A1 Dec. 19, 2013

Related U.S. Application Data

(60) Provisional application No. 61/654,946, filed on Jun. 3, 2012.

(51) Int. Cl.
*F16K 3/30* (2006.01)
*F16K 1/42* (2006.01)
*F16K 3/02* (2006.01)
*F16K 3/20* (2006.01)

(52) U.S. Cl.
CPC ... *F16K 3/30* (2013.01); *F16K 1/42* (2013.01); *F16K 3/0272* (2013.01); *F16K 3/20* (2013.01)

(58) Field of Classification Search
CPC .......... F16K 3/30; F16K 3/20; F16K 3/0272; F16K 1/42
USPC .................. 251/326–329, 359–360, 362–363
See application file for complete search history.

(56) References Cited

U.S. PATENT DOCUMENTS

| 3,929,316 | A | * | 12/1975 | Guthrie | 251/196 |
| 3,982,558 | A | | 9/1976 | Ochs | |
| 3,982,559 | A | | 9/1976 | Ochs | |
| 3,993,284 | A | | 11/1976 | Lukens | |
| 4,006,883 | A | * | 2/1977 | Hilsheimer | 251/307 |
| 4,019,541 | A | | 4/1977 | Koppl | |
| 4,064,912 | A | | 12/1977 | Petrone | |
| 4,127,141 | A | | 11/1978 | Ledonne et al. | |
| 4,141,378 | A | | 2/1979 | Wegner et al. | |
| 4,144,909 | A | | 3/1979 | Harrison | |
| 4,220,269 | A | | 9/1980 | Beckers et al. | |
| 4,225,112 | A | | 9/1980 | Libke | |
| 4,225,113 | A | | 9/1980 | Barthelemy et al. | |
| 4,225,114 | A | | 9/1980 | Barthelemy et al. | |
| 4,231,389 | A | | 11/1980 | Still et al. | |
| 4,239,055 | A | | 12/1980 | Van Coffman | |
| 4,240,460 | A | | 12/1980 | Alaniz | |
| 4,264,054 | A | * | 4/1981 | Morrill | 251/328 |
| 4,313,458 | A | | 2/1982 | Burns et al. | |
| 4,369,813 | A | | 1/1983 | Thomas | |
| 4,389,037 | A | * | 6/1983 | Anders | 251/327 |
| 4,408,627 | A | | 10/1983 | Harris | |
| 4,423,748 | A | | 1/1984 | Ellett | |
| 4,434,816 | A | | 3/1984 | Di Giovanni et al. | |
| 4,446,887 | A | * | 5/1984 | Redmon et al. | 251/363 |
| 4,456,026 | A | | 6/1984 | Kantor | |
| 4,458,721 | A | | 7/1984 | Yie et al. | |
| 4,486,003 | A | * | 12/1984 | Meyer et al. | 251/328 |

(Continued)

*Primary Examiner* — John Bastianelli
(74) *Attorney, Agent, or Firm* — Pauly, Devries, Smith & Deffner, LLC

(57) ABSTRACT

Gate valves having removable interior wear rings that are easily removed from one side of the gate valve upon removal of a retainer ring. The retainer ring is held in place within the valve housing by combination of compressive and shear forces.

17 Claims, 11 Drawing Sheets

(56) References Cited

U.S. PATENT DOCUMENTS

| | | | |
|---|---|---|---|
| 4,529,007 | A | 7/1985 | Goforth |
| 4,552,332 | A | 11/1985 | Sonderegger et al. |
| 4,561,471 | A | 12/1985 | Diaz |
| 4,565,222 | A | 1/1986 | Lundman |
| 4,575,046 | A | 3/1986 | Krause et al. |
| 4,577,834 | A * | 3/1986 | Oliver .................... 251/175 |
| 4,615,506 | A | 10/1986 | Houston |
| 4,671,312 | A | 6/1987 | Bruton |
| 4,671,313 | A | 6/1987 | Houston |
| 4,682,631 | A | 7/1987 | Wilger et al. |
| 4,685,611 | A | 8/1987 | Scobie et al. |
| 4,744,386 | A | 5/1988 | Frazer |
| 4,779,841 | A | 10/1988 | Pupillo et al. |
| 4,800,917 | A | 1/1989 | DePirro |
| 4,836,500 | A | 6/1989 | Pupillo et al. |
| 4,878,651 | A | 11/1989 | Meyer |
| 4,909,272 | A | 3/1990 | Carpentier |
| 4,944,490 | A | 7/1990 | Kennedy |
| 4,977,924 | A | 12/1990 | Scaramucci |
| 5,030,039 | A | 7/1991 | Dove |
| 5,038,817 | A | 8/1991 | Henry et al. |
| 5,038,818 | A | 8/1991 | Jiles |
| 5,074,526 | A | 12/1991 | Ragsdale et al. |
| 5,076,311 | A | 12/1991 | Marschke |
| 5,082,026 | A | 1/1992 | Smith |
| 5,099,868 | A | 3/1992 | Weber |
| 5,148,831 | A | 9/1992 | Kennedy |
| 5,152,311 | A | 10/1992 | McCreary |
| 5,186,199 | A | 2/1993 | Murphy et al. |
| 5,201,872 | A | 4/1993 | Dyer |
| 5,279,320 | A | 1/1994 | Freudendahl |
| 5,312,087 | A | 5/1994 | Jones |
| 5,327,924 | A | 7/1994 | Elgar et al. |
| 5,363,881 | A | 11/1994 | Larkin |
| 5,375,730 | A | 12/1994 | Bahr et al. |
| 5,377,955 | A * | 1/1995 | Baker .................... 251/327 |
| 5,379,803 | A | 1/1995 | Elgar et al. |
| 5,381,815 | A | 1/1995 | Okonek et al. |
| 5,524,663 | A | 6/1996 | Walsh et al. |
| 5,555,998 | A | 9/1996 | Coppola |
| 5,560,388 | A | 10/1996 | Caldwell |
| 5,592,965 | A | 1/1997 | Rakieski |
| 5,657,792 | A | 8/1997 | Prest |
| 5,690,139 | A | 11/1997 | Murphy et al. |
| 5,732,728 | A | 3/1998 | Maichel |
| 5,738,285 | A | 4/1998 | Anderson |
| 5,743,288 | A | 4/1998 | Mosman et al. |
| 5,836,336 | A | 11/1998 | Warzecha |
| 5,878,769 | A | 3/1999 | Goudreault |
| 5,878,784 | A | 3/1999 | Sales et al. |
| 5,883,303 | A | 3/1999 | Bliss et al. |
| 5,884,668 | A | 3/1999 | Larkin |
| 6,041,804 | A | 3/2000 | Chatufale |
| 6,050,541 | A | 4/2000 | Chatufale |
| 6,082,707 | A | 7/2000 | Hosie et al. |
| 6,142,173 | A | 11/2000 | Bekeredjian et al. |
| 6,167,122 | A | 12/2000 | Titmuss et al. |
| 6,260,822 | B1 | 7/2001 | Puranik |
| 6,279,875 | B1 | 8/2001 | Chatufale |
| 6,345,805 | B1 | 2/2002 | Chatufale |
| 6,422,535 | B1 | 7/2002 | Stone et al. |
| 6,522,883 | B2 | 2/2003 | Titmuss et al. |
| 6,564,818 | B2 | 5/2003 | Kroeker et al. |
| 6,648,001 | B2 | 11/2003 | Chatufale |
| 6,664,572 | B2 | 12/2003 | Chatufale |
| 6,679,283 | B1 | 1/2004 | Coscarella |
| 6,688,321 | B2 | 2/2004 | Palmer |
| 6,772,993 | B1 | 8/2004 | Miller et al. |
| 6,843,889 | B2 | 1/2005 | Lah et al. |
| 6,892,752 | B2 | 5/2005 | Burlock et al. |
| 6,942,194 | B2 | 9/2005 | Gravningen et al. |
| 6,966,537 | B2 | 11/2005 | Sundararajan |
| 6,983,759 | B2 | 1/2006 | Maichel et al. |
| 6,997,041 | B1 | 2/2006 | Metzger et al. |
| 7,004,452 | B2 | 2/2006 | Chatufale |
| 7,011,286 | B2 | 3/2006 | Boice |
| 7,033,460 | B2 | 4/2006 | Lah et al. |
| 7,040,337 | B1 | 5/2006 | Johnson |
| 7,306,201 | B2 | 12/2007 | Lam |
| 7,445,019 | B2 | 11/2008 | Brenes et al. |
| 7,458,559 | B2 | 12/2008 | Blenkush |
| 7,562,859 | B2 | 7/2009 | Lam et al. |
| 7,628,381 | B2 | 12/2009 | Phillips et al. |
| 7,731,242 | B2 | 6/2010 | Coscarella |
| 7,931,251 | B2 | 4/2011 | Partridge |
| 7,946,556 | B1 | 5/2011 | Trott |

* cited by examiner

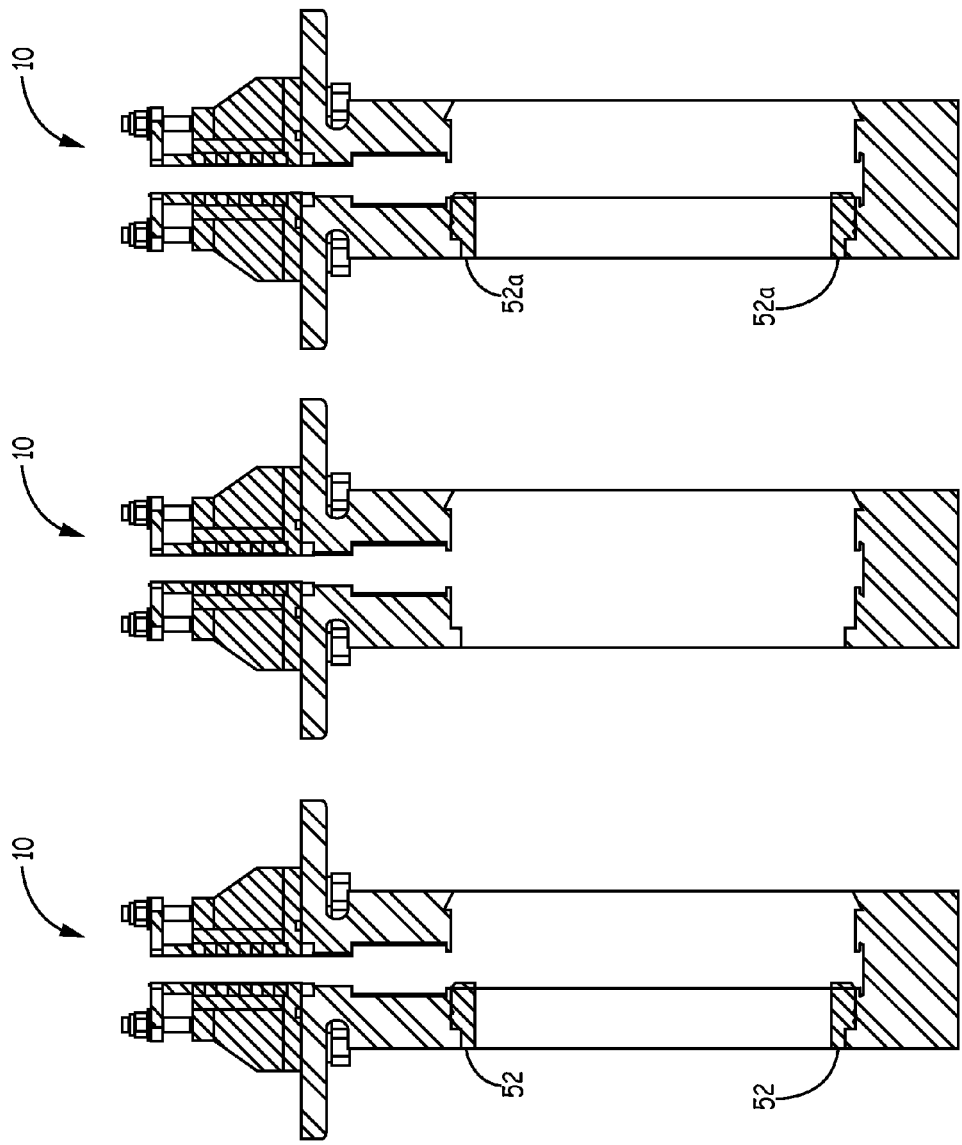

WEAR RING RETAINER FOR A GATE VALVE

This application claims the benefit of U.S. Provisional Application No. 61/654,946, filed Jun. 3, 2012, the contents of which are herein incorporated by reference.

FIELD OF THE INVENTION

The present invention is directed to improved valves having removable interior wear rings. In particular, the invention is directed to gate valves having removable interior wear rings that are easily removed and replaced from one side of the gate valve, and held in place with a retainer ring.

BACKGROUND OF THE INVENTION

Large gate valves are commonly used in a wide range of applications, including mining, manufacturing, refining, sewer and water, and many others. In many of these applications, such as the use of large gate valves in the transportation of water, the valves can remain in use for many years, and even decades, with relatively little significant maintenance or service. However, many other large gate valves are often used in extremely challenging environments where the interior surfaces of the valve components are exposed to abrasive or corrosive materials that can rapidly degrade all but the most durable of materials. For example, carrying of mining slurries with significant amounts of rock and sand can wear away interior valve components rapidly. Similarly, tar sands, such as those mined in western Canada for fuel, are processed at elevated temperatures and with very high solids contents that readily degrade the interior of valves as they pass through.

In order to promote longer service life of valves, especially large gate valves that operate in extreme conditions, it is possible to create replaceable surfaces that line portions of the inside of the valves. These replaceable surfaces can be made of much harder materials than the other valve components— in part because they require less elaborate machining than other parts, and also because they can use higher priced metals without requiring such materials throughout the valve. In addition, the removable nature of the replaceable surface allows them to be replaced without replacing or rebuilding the entire valve.

Unfortunately, one challenge of existing gate valve designs is that it can be difficult to replace the wear surfaces because existing systems for installing, retaining, and removing the wear surfaces have significant shortcomings. Therefore, a need exists for an improved valve design that allows for the easy installation of wear surfaces, for the secure retention of the wear surfaces, and the efficient and easy removal and replacement of the wear surfaces when desired.

SUMMARY OF THE INVENTION

The present invention is directed to a gate valve having wear rings that are easily removable and replaced during service of the gate valve. The wear rings are formed of a durable material much harder than typical valve components. Suitable wear rings can be made, for example, out of white iron. In an example implementation the gate valve includes a retainer ring on at least one side of the valve, the retainer ring configured to secure the wear rings in place with a combination of compressive and shear forces. The invention is also directed to retainer rings and to methods of installing and removing wear rings and retainer rings.

In an example implementation, the gate valve comprises a valve housing comprising a first opening, a second opening and an interior. A gate is configured to move into and out of the interior of the valve housing so as to substantially prevent the flow of liquids through the valve when the gate is inserted into the interior of the valve housing.

First and second wear rings are positioned within the valve housing, the wear rings positioned on either side of the path of the gate so as to partially line the interior of the valve housing. A retaining ring for securing the first wear ring in the valve housing extends around at least a portion of a first opening of the valve. The retainer ring comprising a front surface configured to face the exterior of the valve, a back surface configured to face the interior of the valve, an inner surface along the interior circumference of the retaining ring, and an outer surface along the exterior circumference of the retaining ring. In certain embodiments the outer surface of the retaining ring is configured to contact the housing of the valve such that the retaining ring applies compressive and shear loads to the housing.

In another example embodiment of the invention, the gate valve comprises a valve housing having a first opening, a second opening, and a gate, wherein the gate is configured to move into and out of the interior of the valve housing so as to substantially prevent the flow of liquids through the valve housing. First and second wear rings are inserted within the valve housing, the wear rings positioned on either side of the path of the gate. A retaining ring for securing the first wear ring is positioned in the valve housing, the retaining ring configured for extending around at least a portion of the first opening of the valve. The retaining ring comprises a front surface configured to face the exterior of the valve. A back surface is configured to face the interior of the valve. The back surface is in contact with the first retainer ring. An inner surface along the interior circumference of the retaining ring is in contact with the first retainer ring, and an outer surface along the exterior circumference of the retaining ring is in contact with the valve housing.

The outer surface along the exterior circumference of the retaining ring can be inclined relative to the primary axis of flow of fluids through the interior of the valve so as to apply compressive and shear forces, allowing the retaining ring to be installed.

In certain embodiments the front surface of the retaining ring has a smaller surface area than the back surface of the retaining ring. In some implementations the front surface of the retaining ring has a smaller outside diameter than the outside diameter of the back surface of the retainer ring. The front surface of the retaining ring can have an outside diameter that is substantially equal to the outside diameter of the back surface of the retainer ring.

As described above, the first wear ring is held between the retaining ring and a first side of the gate. The second wear ring is held between an opposed flange in the housing of the gate valve and a second side of the gate. The first wear ring is generally removable from the interior of the valve housing by withdrawing the gate, pushing the wear ring into the gate path, removing the retainer ring, and then withdrawing the wear ring through the first opening in the valve housing. The second wear ring is removable from the interior of the valve housing by withdrawing the second wear ring though the first opening in the valve housing after the first wear ring has been removed.

In some implementations the retainer ring is formed in at least two parts: a primary part forming at least 180 degrees of a circle, and a keystone piece forming less than 180 degrees of a circle. Optionally, the retainer ring is formed in at least two parts with a primary part forming at least 270 degrees of a circle, and a keystone piece forming less than 90 degrees of a circle. Alternatively, the retainer ring is formed in at least two parts with a primary part forming at least 330 degrees of a circle, and a keystone piece forming less than 30 degrees of a circle. The retainer ring is desirably substantially flush with the first opening of the valve housing. Exposed portions of the first wear ring are also desirably substantially flush with the first opening of the valve housing. In addition, exposed portions of the second wear ring are desirably substantially flush with the first opening of the valve housing.

The above summary of the present invention is not intended to describe each discussed embodiment of the present invention. This is the purpose of the figures and the detailed description that follows.

BRIEF DESCRIPTION OF THE DRAWINGS

The invention may be more completely understood and appreciated in consideration of the following detailed description of various embodiments of the invention in connection with the accompanying examples reflected in the drawings.

FIGS. 9A to 9I are side cross sectional views of a gate valve made in accordance with an implementation of the invention, the cross sectional views showing steps undertaken to replace two seat rings in accordance with the teachings of the present invention:

FIG. 9A shows the gate valve with the gate withdrawn.

FIG. 9B shows moving a first seat ring into the gate valve channel.

FIG. 9C shows the gate valve with the retainer ring removed.

FIG. 9D shows the gate valve with the first seat ring removed.

FIG. 9E shows the gate valve with the second seat ring removed.

FIG. 9F shows the gate valve with a third seat ring inserted.

FIG. 9G shows the gate valve with a fourth seat ring inserted.

FIG. 9H shows the gate valve with the retainer ring re-installed.

FIG. 9I shows the gate valve with reassembled.

Figure 1:
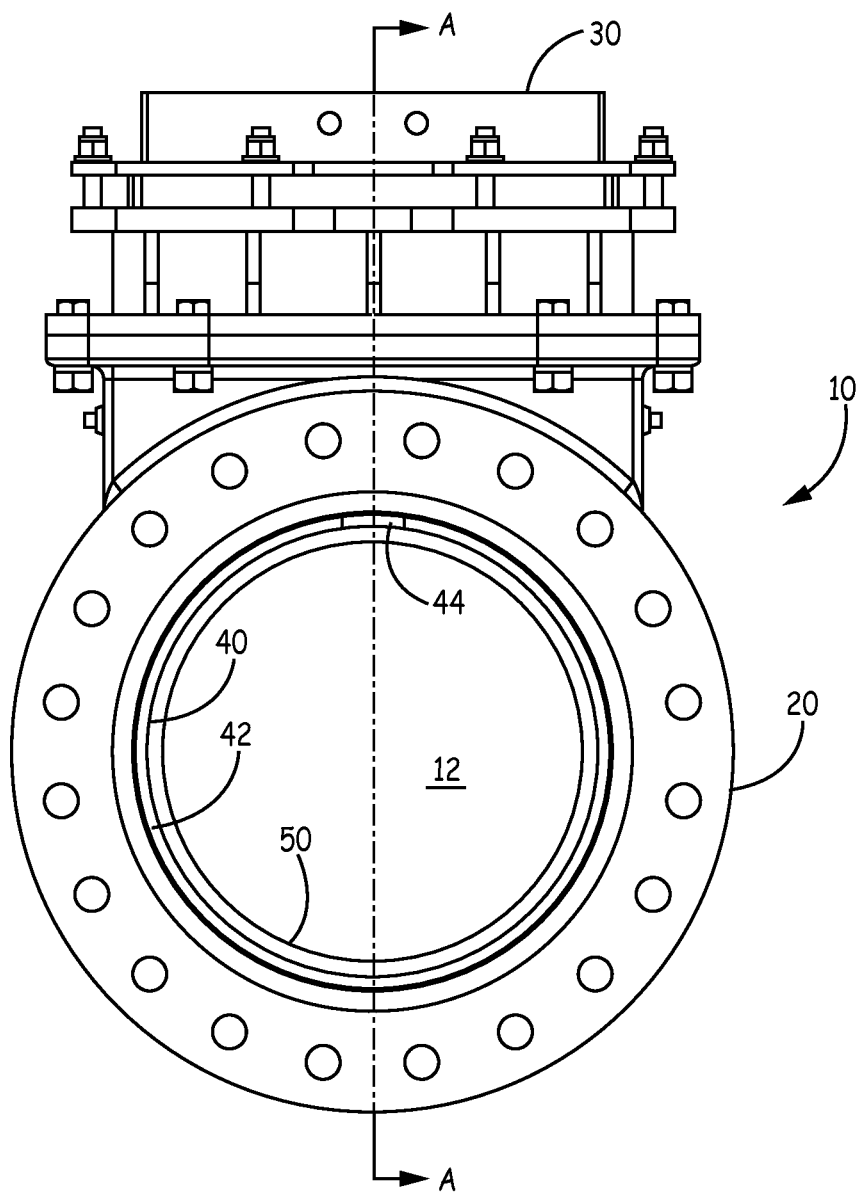
FIG. 1 is an end view of a gate valve constructed in accordance with an implementation of the invention.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

The present invention is directed to a gate valve having wear rings that are easily removable and replaced during service of the gate valve. The wear rings are formed of a durable material much harder than typical valve components. Suitable wear rings can be made, for example, out of white iron. In an example implementation the gate valve includes a retainer ring on at least one side of the valve, the retainer ring configured to secure the wear rings in place with a combination of compressive and shear forces. The invention is also directed to retainer rings and to methods of installing and removing wear rings and retainer rings.

In an example implementation, the gate valve comprises a valve housing comprising a first opening, a second opening and an interior. A gate is configured to move into and out of the interior of the valve housing so as to substantially prevent the flow of liquids through the valve when the gate is inserted into the interior of the valve housing.

First and second wear rings are positioned within the valve housing, the wear rings positioned on either side of the path of the gate so as to partially line the interior of the valve housing. A retaining ring for securing the first wear ring in the valve housing extends around at least a portion of a first opening of the valve. The retainer ring comprising a front surface configured to face the exterior of the valve, a back surface configured to face the interior of the valve, an inner surface along the interior circumference of the retaining ring, and an outer surface along the exterior circumference of the retaining ring. In certain embodiments the outer surface of the retaining ring is configured to contact the housing of the valve such that the retaining ring applies compressive and shear loads to the housing, thereby securing the wear rings behind it without the use of significant screws or bolts.

In another example embodiment of the invention, the gate valve comprises a valve housing having a first opening, a second opening, and a gate, wherein the gate is configured to move into and out of the interior of the valve housing so as to substantially prevent the flow of liquids through the valve housing. First and second wear rings are inserted within the valve housing, the wear rings positioned on either side of the path of the gate. A retaining ring for securing the first wear ring is positioned in the valve housing, the retaining ring configured for extending around at least a portion of the first opening of the valve. The retaining ring comprises a front surface configured to face the exterior of the valve. A back surface is configured to face the interior of the valve. The back surface is in contact with the first retainer ring. An inner surface along the interior circumference of the retaining ring is in contact with the first retainer ring, and an outer surface along the exterior circumference of the retaining ring is in contact with the valve housing.

The outer surface along the exterior circumference of the retaining ring can be inclined relative to the primary axis of flow of fluids through the interior of the valve so as to apply compressive and shear forces.

In certain embodiments the front surface of the retaining ring has a smaller surface area than the back surface of the retaining ring. In some implementations the front surface of the retaining ring has a smaller outside diameter than the outside diameter of the back surface of the retainer ring. The front surface of the retaining ring can have an outside diameter that is substantially equal to the outside diameter of the back surface of the retainer ring.

As described above, the first wear ring is held between the retaining ring and a first side of the gate. The second wear ring is held between an opposed flange in the housing of the gate valve and a second side of the gate. The first wear ring is generally removable from the interior of the valve housing by withdrawing the gate, pushing the wear ring into the gate path, removing the retainer ring, and then withdrawing the wear ring through the first opening in the valve housing. The second wear ring is removable from the interior of the valve housing by withdrawing the second wear ring through the first opening in the valve housing after the first wear ring has been removed.

In some implementations the retainer ring is formed in at least two parts: a primary part forming at least 180 degrees of a circle, and a keystone piece forming less than 180 degrees of a circle. Optionally, the retainer ring is formed in at least two parts with a primary part forming at least 270 degrees of a circle, and a keystone piece forming less than 90 degrees of a circle. Alternatively, the retainer ring is formed in at least two parts with a primary part forming at least 330 degrees of a circle, and a keystone piece forming less than 30 degrees of a circle. The retainer ring is desirably substantially flush with the first opening of the valve housing. Exposed portions of the first wear ring are also desirably substantially flush with the first opening of the valve housing. In addition, exposed portions of the second wear ring are desirably substantially flush with the first opening of the valve housing.

Referring now to the drawings, FIG. 1 is an end view of a gate valve 10 constructed in accordance with an implementation of the invention, the gate valve 10 having a housing 20. The gate valve 10 includes a first opening 12 which leads into an interior volume and out the back side of the valve through a second opening (not shown). A gate 30 is insertable into the interior volume of the housing 20 of the valve 10, the gate 30 serving to prevent or regulate the flow of fluids through the valve. Also shown in FIG. 1 is an exposed portion of a wear ring 50, held in place by a retainer ring 40. The retainer ring 40 depicted in the present embodiment is formed in two parts: a first retainer ring portion 42 extending around nearly the entirety of the first opening 12, plus a small keystone retainer ring portion 44 which completes a small portion of the ring. The purpose of the keystone retainer ring portion 44 is to allow the first retainer ring portion 42 to be installed, and then to subsequently install the keystone portion. The keystone retainer ring portion 44 is shown at the top in FIG. 1, it should be understood that the keystone retainer ring portion 44 can be located at other places around the first opening 12.

Figure 2:
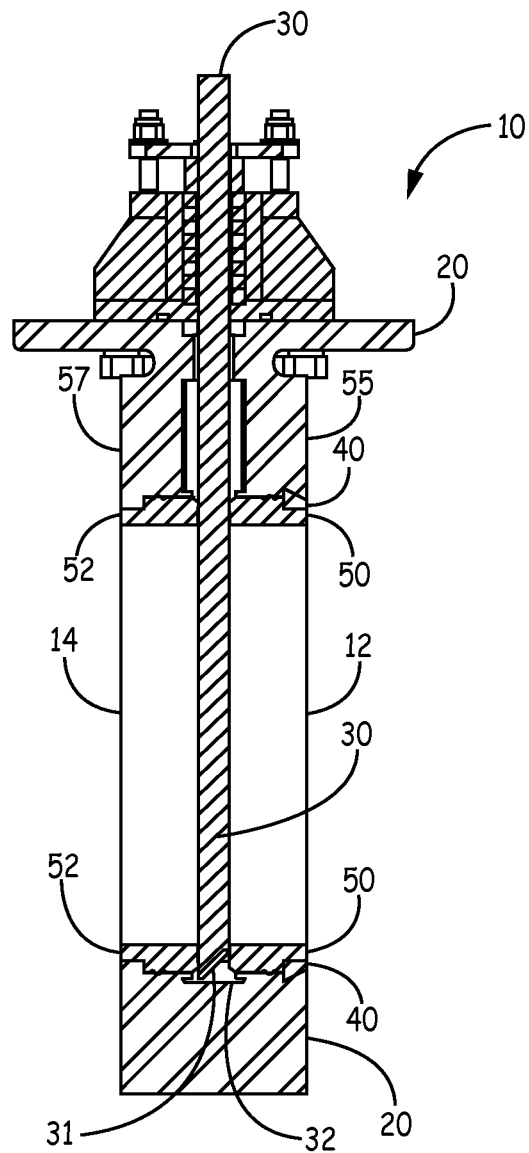
FIG. 2 is a side cross-sectional view of the gate valve of FIG. 1 taken along line A-A of FIG. 1, showing internal components of the valve.
Figure 3:
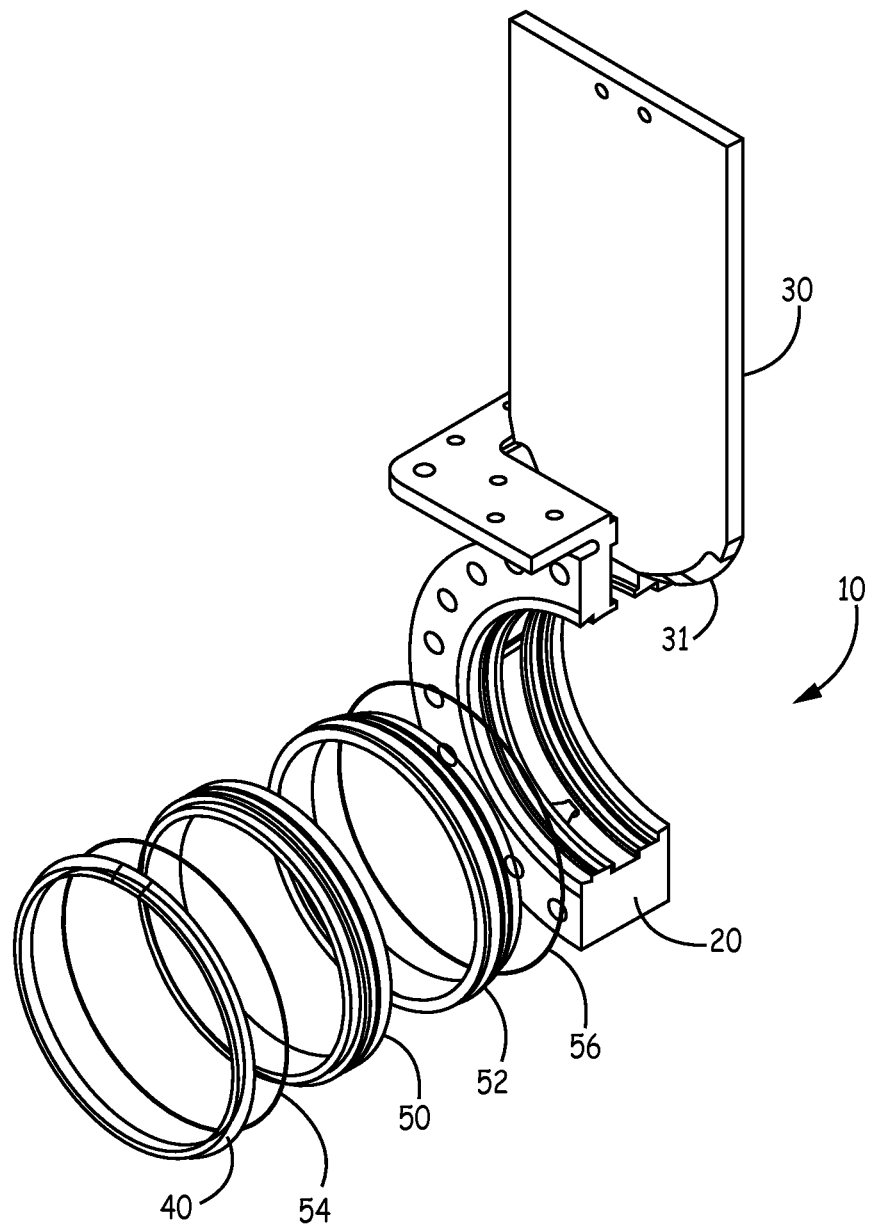
FIG. 3 is an exploded partial perspective view of the gate valve of FIG. 1, showing the gate valve housing, the gate valve, a pair of wear rings, and a retaining ring.

These features of the valve 10 are shown in further detail in FIG. 2 and FIG. 3. First, FIG. 2 is a side cross-sectional view of the gate valve of FIG. 1 taken along cross section A-A of FIG. 1, and showing internal components of the valve 10. Gate 30 is shown inserted into a pathway or channel in the valve housing 20 of the valve 10. On one side (the right, as depicted in FIG. 2), a cross section of a first wear ring 50 is shown. The front of the first wear ring 50 is flush with a front surface 55 of the valve housing 20. The back of the first wear ring 50 is flush with the gate 30 (or gate channel or path when the gate is removed). The first wear ring substantially encircles and forms the first opening 12 of the valve 10. On the second side (the left, as depicted in FIG. 2), a cross section of the second wear ring 52 is shown. The front of the second wear ring 52 is flush with a back surface 57 of the valve housing 20. The second wear ring 52 substantially encircles and forms the second opening 14 to the valve 10. It will be observed that the majority of the interior surface of the housing 20 of the valve 10 is covered by the wear rings 50, 52. In particular, the surfaces that would be most exposed to abrasive wear (such as from slurries) are protected by the wear rings. Removal and replacement of these wear rings allows for extended life of the valve without replacement of the entire valve.

Also shown in FIG. 2 is a recess 32 in the valve housing 20, the recess for receiving the tip 31 of the gate 30 when the gate is inserted fully into the housing 20 of the valve 10.

In an embodiment, the retainer ring 40, the first wear ring 50, and the second wear ring 52 are held in place during operation with friction. In an embodiment, one or more fasteners (such as a screw, a bolt, or an adhesive) hold the retainer ring 40, the first wear ring 50, and the second wear ring 52 in place.

FIG. 3 is an exploded partial perspective view of the gate valve 10 of FIG. 1, showing the valve housing 20, the gate 30, a pair of wear-rings 50 and 52, and a retainer ring 40 for securing the two wear rings 50, 52 in place. Two optional o-rings 54, 56 are also shown. The o-rings 54, 56 are optional in that alternative seal arrangements can be used rather than these o-rings.

Figure 4:
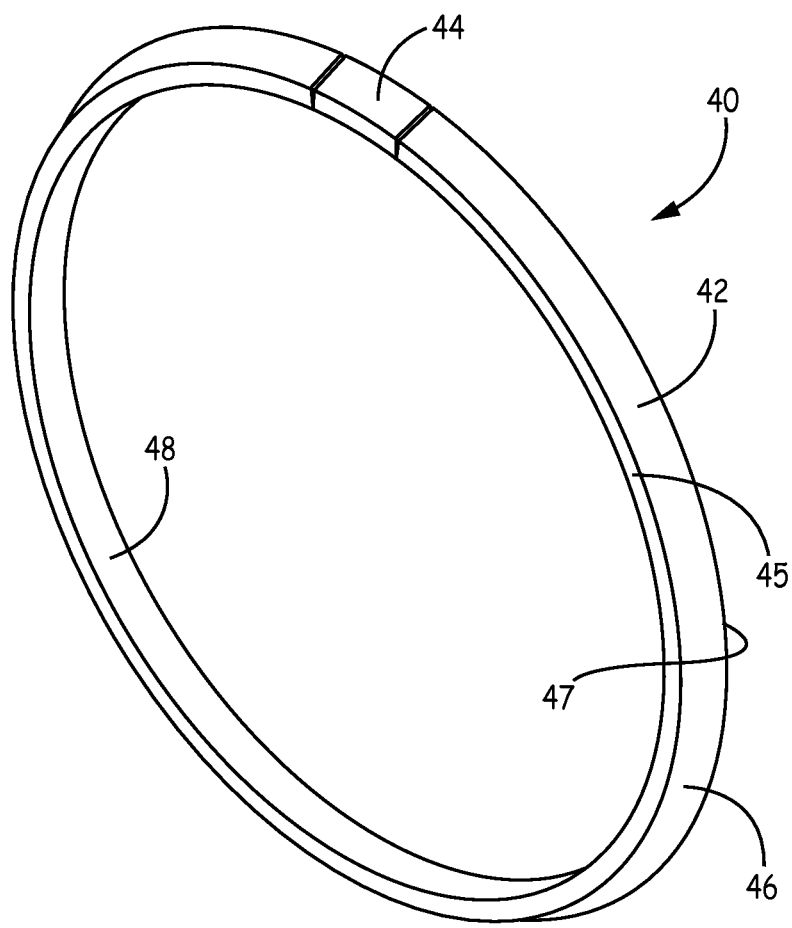
FIG. 4 is a perspective view of a retainer ring for use in valve, the retainer ring constructed in accordance with the teachings of the invention.

FIG. 4 is a perspective view of a retainer ring 40 for use in valve 10, the retainer ring 40 shown in the example of FIG. 4 has a first portion 42 forming the majority of the ring 40, plus a keystone portion 44. The purpose of the keystone retainer ring portion 44 is to allow the first retainer ring portion 42 to be installed, and then to subsequently install the keystone portion 44. The retainer ring 40 has a front surface 45 and a back surface 47. In addition, the retainer ring 40 includes an outer surface 46 and an inner surface 48. In certain embodiments the front surface 45 of the retaining ring 40 has a smaller surface area than the back surface 47 of the retaining ring 40. In some implementations the front surface 45 of the retaining ring 40 has a smaller outside diameter than the outside diameter of the back surface 47 of the retainer ring. The front surface 45 of the retaining ring 40 can have an outside diameter that is substantially equal to the outside diameter of the back surface 47 of the retainer ring 40.

Figure 5:
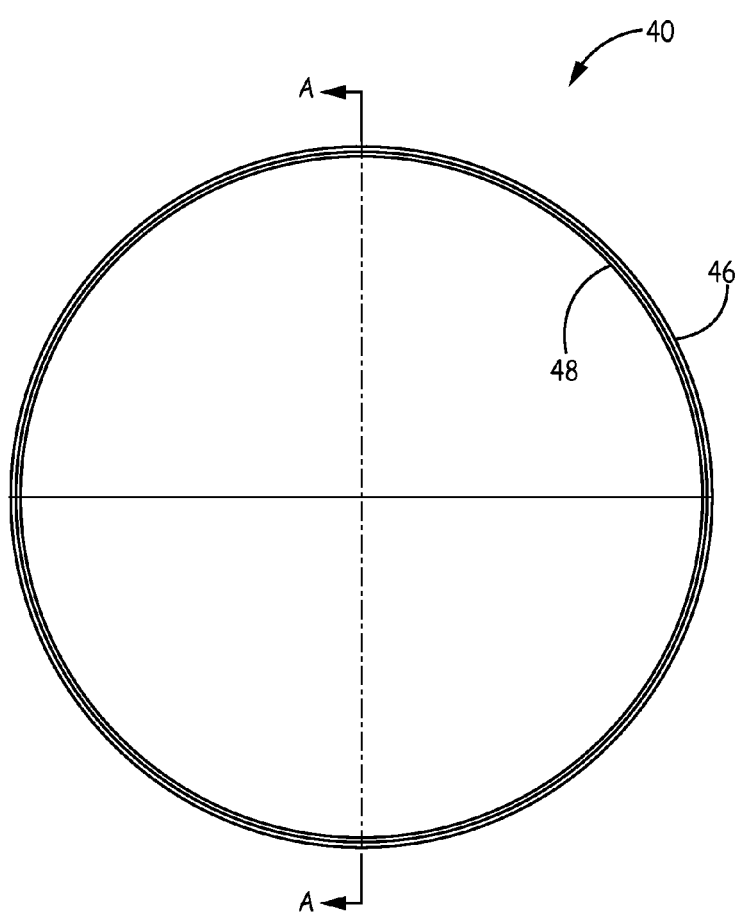
FIG. 5 is a front view of a retainer ring for use in valve, the retainer ring constructed in accordance with the teachings of the invention.
Figure 6:
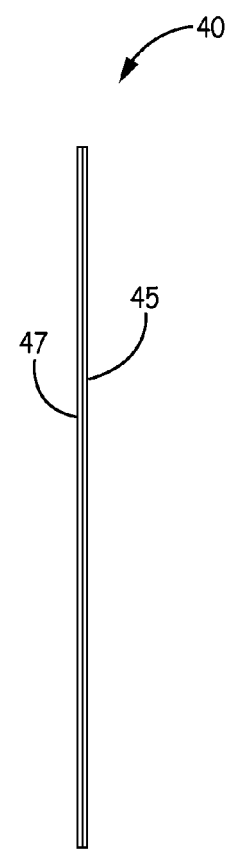
FIG. 6 is a side view of a retainer ring for use in valve, the retainer ring constructed in accordance with the teachings of the invention.

FIG. 5 is a front view of a retainer ring for use in valve, the retainer ring constructed in accordance with the teachings of the invention; and FIG. 6 is a side view of a retainer ring for use in valve, the retainer ring constructed in accordance with the teachings of the invention.

Figure 7:
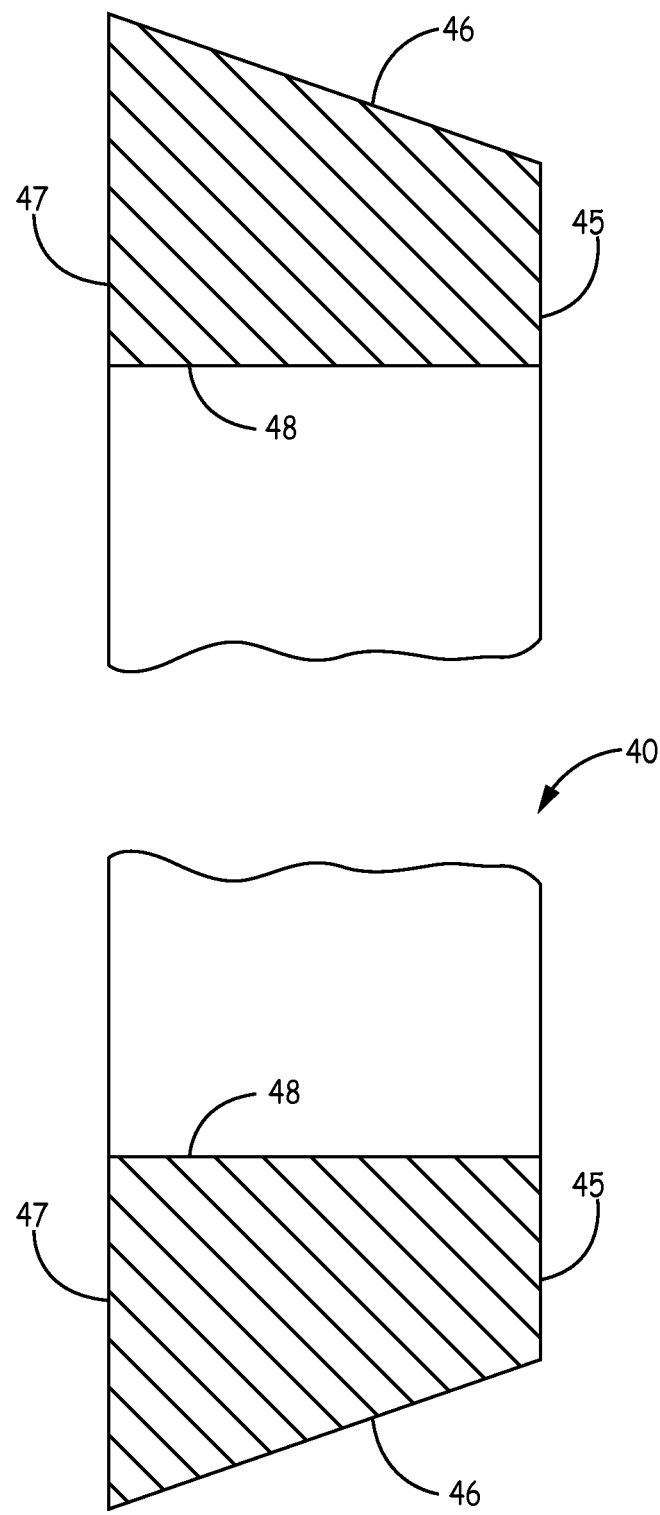
FIG. 7 is an enlarged partial side cross sectional view of a retainer ring for use in a valve, the retainer ring constructed in accordance with the teachings of the invention and removed from the valve housing.

FIG. 7 is an enlarged partial side cross sectional view of a retainer ring for use in a valve, the retainer ring constructed in accordance with the teachings of the invention and removed from the valve housing. In an embodiment front surface 45 and back surface 47 can be parallel with each other. Similarly, inner surface 46 and outer surface 48 can be parallel. In an embodiment, such as shown in FIG. 7, inner surface 46 and outer surface 48 can be non-parallel. As noted above the front surface 45 of the retaining ring 40 typically has a smaller surface area than the back surface 47 of the retaining ring 40. In some implementations the front surface 45 of the retaining ring 40 has a smaller outside diameter than the outside diameter of the back surface 47 of the retainer ring. The front surface 45 of the retaining ring 40 can have an outside diameter that is substantially equal to the outside diameter of the back surface 47 of the retainer ring 40. The outer surface 46 along the exterior circumference of the retaining ring 40 can be inclined relative to the primary axis of flow of fluids through the interior of the valve so as to apply compressive and shear forces, allowing the retaining ring to be installed, and also providing a very secure fit for the wear rings.

Figure 8:
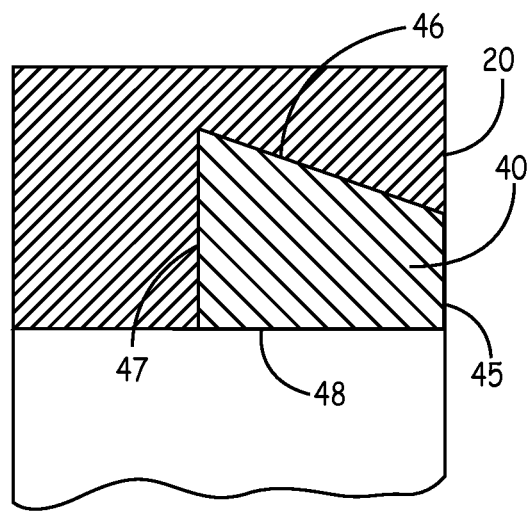
FIG. 8 is an enlarged partial side cross sectional view of a retainer ring for use in valve, the retainer ring constructed in accordance with the teachings of the invention and inserted in the valve housing.
Figure 8:
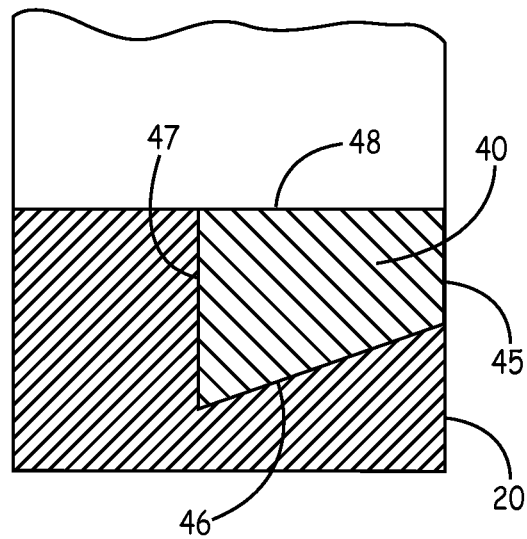

FIG. 8 is an enlarged partial side cross sectional view of a retainer ring for use in valve, the retainer ring constructed in accordance with the teachings of the invention and inserted in the valve housing 20. In an embodiment where the outer surface 46 is inclined, the housing 20 can have a surface that is inclined, such as to match the incline of the outer surface (show in FIG. 8).

Figure 9C:
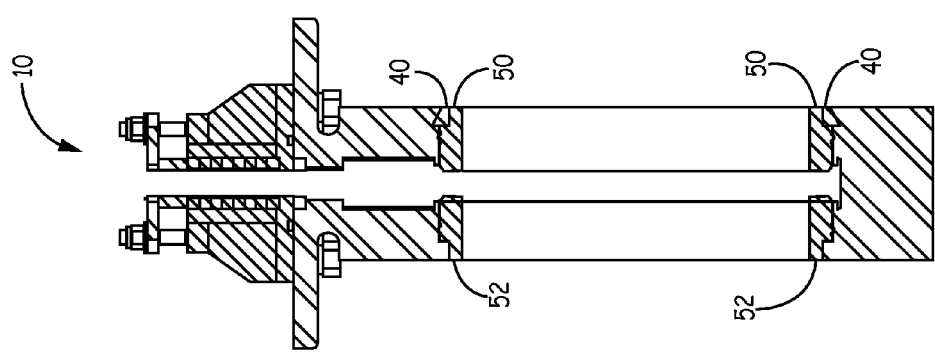
Figure 9B:
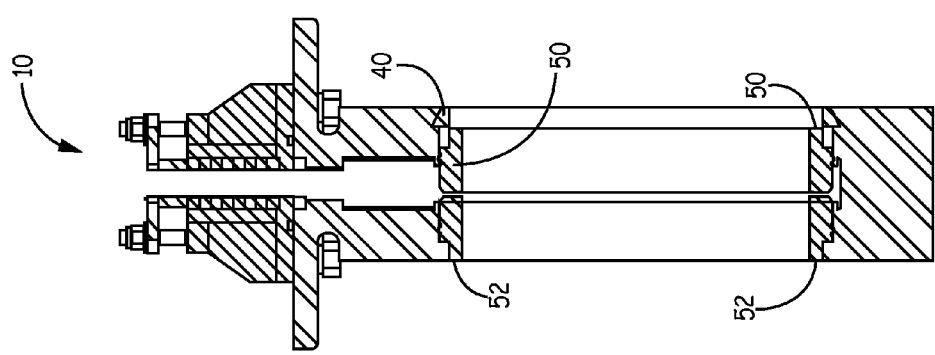
Figure 9A:
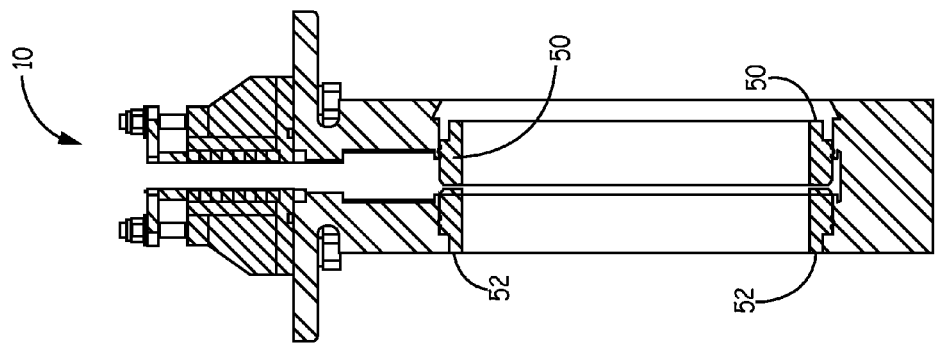

FIGS. 9A to 9I are side cross sectional views of a gate valve made in accordance with an implementation of the invention, the cross sectional views showing steps undertaken to replace two seat rings in accordance with the teachings of the present invention. FIG. 9A shows the gate valve with the gate withdrawn prior to beginning operation to remove and replace the wear rings 50, 52. In this depiction the gate is entirely removed. However, it will be understood that the gate does not necessarily need to be completely removed, but can be simply withdrawn high enough to allow service of the ear rings 50, 52.

Next, FIG. 9B shows moving a first wear ring 50 into the gate valve channel. Generally once the gate is removed or withdrawn the wear ring can be pressed into the gate valve channel by pressing it inward. Once the first wear ring 50 is inserted into the gate channel or pathway, the retainer ring 40 can be removed. In some implementations the retainer ring 40 is removed by first removing the keystone segment (if present), and then pulling out the rest of the retaining ring 40. The retaining ring is typically formed of a metal having at least some flexibility to allow it to be bent into a smaller diameter (once the keystone piece is removed) and then pulled out of the housing. FIG. 9C shows the gate valve with the retainer ring removed.

Figure 9G:
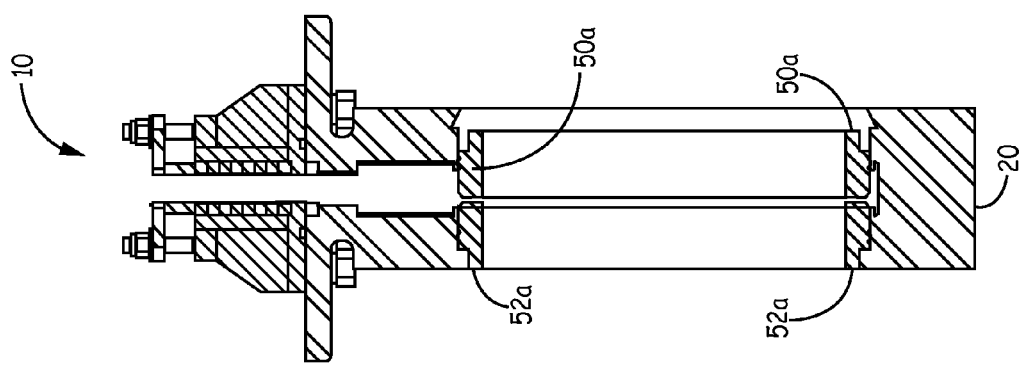
Figure 9H:
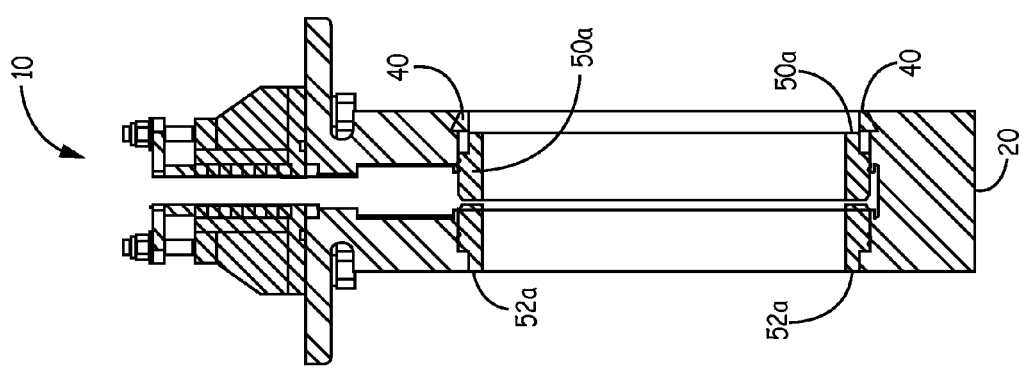
Figure 9I:
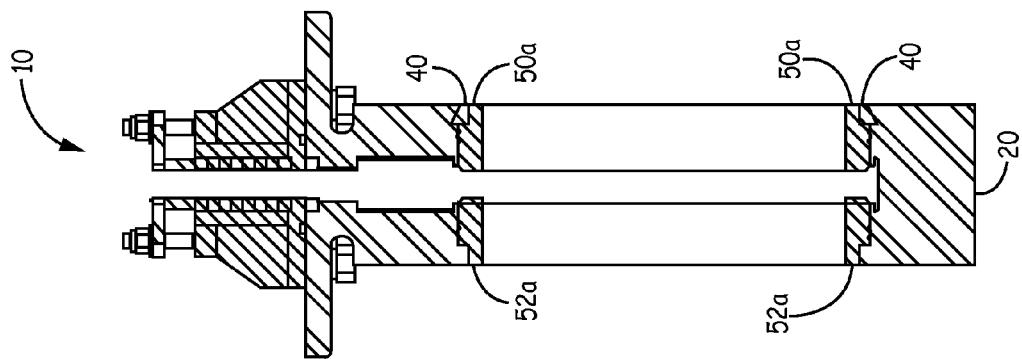

FIG. 9D shows the gate valve with the first wear ring 50 removed from the housing after removing the retainer ring 40. Thereafter the second wear ring 52 can be pulled backward through the same opening in the valve housing. FIG. 9E shows the gate valve with the second wear ring 52 removed. Thereafter new wear rings are reinstalled in the opposite order of removal: FIG. 9F shows the gate valve with a third wear ring 52a inserted. FIG. 9G shows the gate valve with a fourth wear ring 50a inserted. FIG. 9H shows the gate valve with the retainer ring 40 re-installed. This is typically the same retainer ring 40 that was removed, but can optionally be a new retainer ring. FIG. 9I shows the gate valve 10 reassembled.

Figures 10A, 10B:
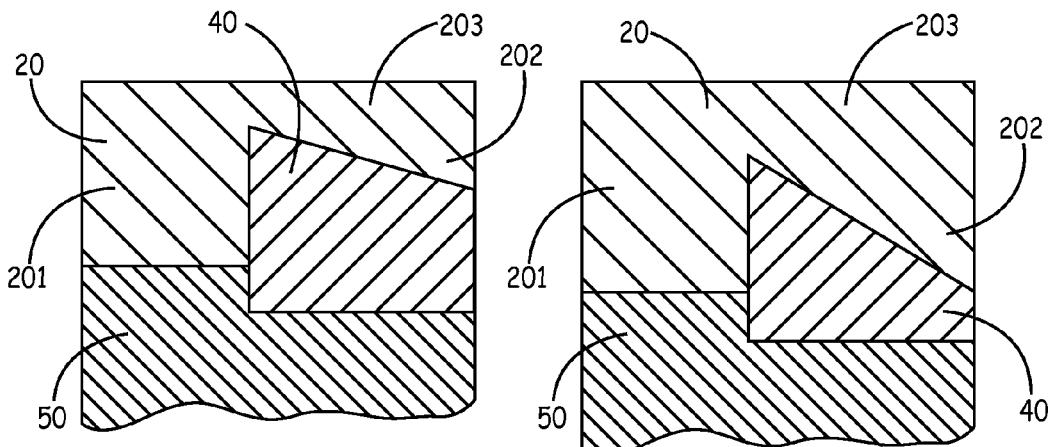
FIGS. 10A to 10F show cross sections of six alternative retainer rings constructed in accordance with the teachings of the present invention.
Figures 10C, 10D:
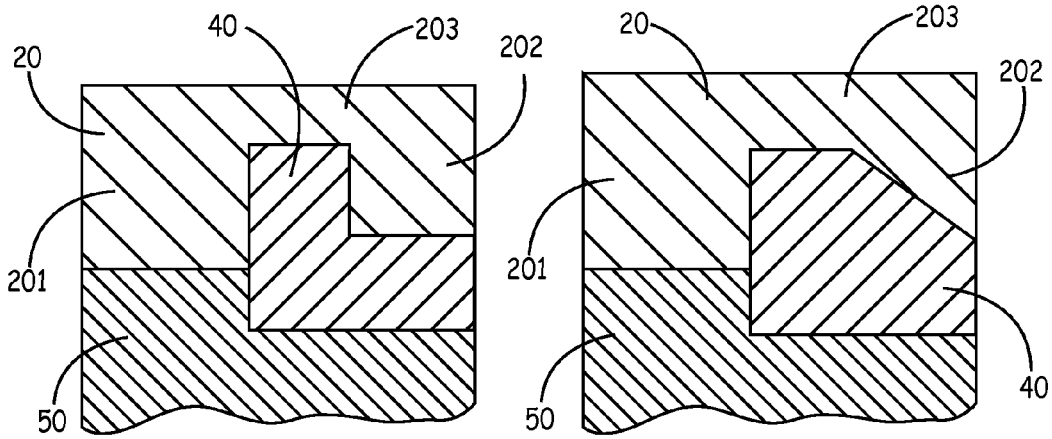
Figures 10E, 10F:
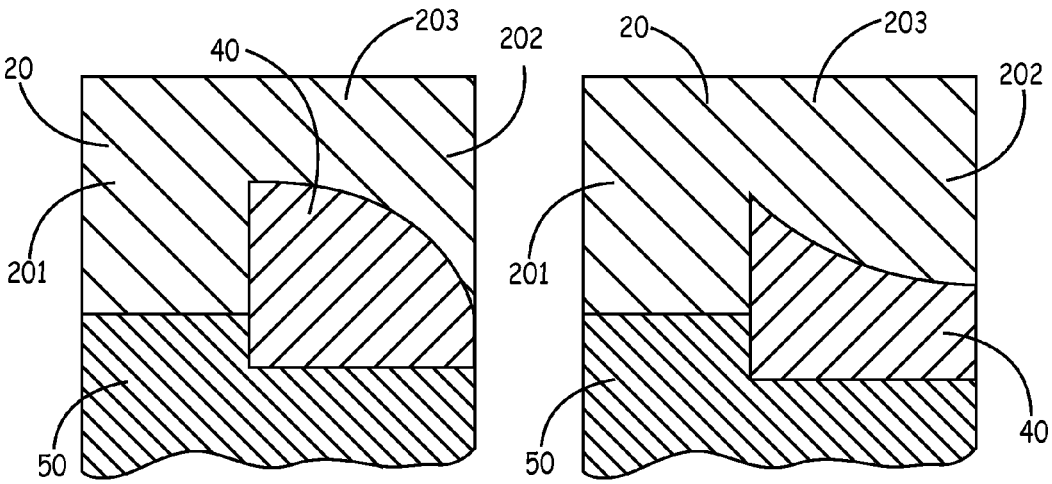

FIGS. 10A-10F show cross sections of alternative retainer rings constructed in accordance with the teachings of the present invention. The retainer ring can have many different shapes. A cross section of the retainer ring can include linear edges (as shown in FIGS. 10A, 10B, 10C, and 10D) or a combination of linear edges and non-linear edges (as shown in FIGS. 10E and 10F). The edges of the retainer ring can closely resemble the edges of the housing. When the retainer ring is located in its desired position relative with the housing 20 and the first wear ring 50, a portion 201 of the housing can be to the left of a portion of the retainer ring, a portion 202 of the housing can be to the right of a portion of the retainer ring and a portion 203 of the housing can be above the retainer ring (as seen in the cross sections of FIG. 10). A portion of the housing to the left, right and above a portion of the retainer ring can he restrict movement of the retainer ring while the valve is in operation.

All publications and patent applications in this specification are indicative of the level of ordinary skill in the art to which this invention pertains. All publications and patent applications are herein incorporated by reference to the same extent as if each individual publication or patent application was specifically and individually indicated by reference.

It will be appreciated that, although the implementation of the invention described above is directed to a hard drive enclosure, the present device may be used with other electronic enclosures, and is not limited to hard drive enclosures. In addition, while the present invention has been described with reference to several particular implementations, those skilled in the art will recognize that many changes may be made hereto without departing from the spirit and scope of the present invention.

We claim:

1. A gate valve, the gate valve comprising:
a valve housing comprising a first opening, a second opening and an interior, wherein a gate is configured to move into and out of the interior of the valve housing so as to substantially prevent a flow of liquids through the valve housing when the gate is inserted into the interior of the valve housing;
first and second wear rings inserted within the valve housing, the wear rings positioned on either side of the path of the gate so as to partially line the interior of the valve housing; and
a retaining ring for securing the first wear ring in the valve housing, the retaining ring configured for extending around at least a portion of the first opening of the valve; the retainer ring comprising a front surface configured to face the exterior of the valve, a back surface configured to face the interior of the valve, an inner surface along the interior circumference of the retaining ring, and an outer surface along the exterior circumference of the retaining ring;
wherein the outer surface of the retaining ring is configured to contact the housing of the valve such that the retaining ring applies compressive and shear loads to the housing.

2. The gate valve of claim 1, wherein the front surface of the retaining ring has a smaller surface area than the back surface of the retaining ring.

3. The gate valve of claim 1, wherein the front surface of the retaining ring has a smaller outside diameter than outside diameter of the back surface of the retainer ring.

4. The gate valve of claim 1, wherein the front surface of the retaining ring has an outside diameter that is substantially equal to the outside diameter of the back surface of the retainer ring.

5. The gate valve of claim 1, wherein the outer surface along the exterior circumference of the retaining ring is inclined relative to the primary axis of flow of fluids through the interior of the valve.

6. The gate valve of claim 1, wherein the first wear ring is held between the retaining ring and a first side of the gate.

7. The gate valve of claim 1, wherein the second wear ring is held between a flange in the housing of the gate valve and a second side of the gate.

8. The gate valve of claim 1, wherein the first wear ring is removable from the interior of the valve housing by withdrawing the gate, pushing the wear ring into the gate path, removing the retainer ring, and then withdrawing the wear ring through the first opening in the valve housing.

9. The gate valve of claim 8, wherein the second wear ring is removable from the interior of the valve housing by withdrawing the second wear ring through the first opening in the valve housing after the first wear ring has been removed.

10. The gate valve of claim 1, wherein the retainer ring is formed in at least two parts: a primary part forming at least 180 degrees of a circle, and a keystone piece forming less than 180 degrees of a circle.

11. The gate valve of claim 1, wherein the retainer ring is substantially flush with the first opening of the valve housing.

12. The gate valve of claim 1, wherein exposed portions of the second wear ring are substantially flush with the first opening of the valve housing.

13. The gate valve of claim 1, wherein the retainer ring is held in place substantially without screws.

14. A gate valve, the gate valve comprising:
   a valve housing comprising a first opening, a second opening, and a gate, wherein the gate is configured to move into and out of an interior of the valve housing so as to substantially prevent a flow of liquids through the valve housing when the gate is inserted into the interior of the valve housing;
   first and second wear rings inserted within the valve housing, the wear rings positioned on either side of the path of gate; and
   a retaining ring for securing the first wear ring in the valve housing, the retaining ring configured for extending around at least a portion of the first opening of the valve; wherein the retaining ring comprises;
      a front surface configured to face the exterior of the valve;
      a back surface configured to face the interior of the valve, the back surface in contact with the first wear ring;
      an inner surface along the interior circumference of the retaining ring, the inner surface in contact with the first wear ring; and
      an outer surface along the exterior circumference of the retaining ring the outer surface in contact with the housing of the valve such that the retaining ring applies compressive and shear loads to the housing.

15. The gate valve of claim 14, wherein the outer surface of the retainer ring is substantially inclined.

16. The gate valve of claim 14, wherein the front surface of the retaining ring has a smaller surface area than the back surface of the retaining ring.

17. The gate valve of claim 14, wherein the front surface of the retaining ring has a smaller outside diameter than outside diameter of the back surface of the retainer ring.

* * * * *